United States Patent Office 3,134,816
Patented May 26, 1964

3,134,816
PREPARATION OF SECONDARY FLUOROALKYL AMINES
Francis L. Scott, Elkins Park, and Robert E. Oesterling, Flourtown, Pa., assignors to Pennsalt Chemicals Corporation, Philadelphia, Pa., a corporation of Pennsylvania
No Drawing. Filed Dec. 16, 1959, Ser. No. 859,863
8 Claims. (Cl. 260—583)

This invention deals with a novel process for the preparation of secondary fluoroalkylamines. More particularly, this invention relates to the preparation of amines of structure $$R_f\text{—}CH_2\text{—}NH\text{—}CH_2\text{—}R_f$$

where $R_f$ are perfluoroalkyl radicals which may be the same or different. The lower molecular weight compounds prepared by the process of this invention, i.e., where $R_f$ contains 1 to 3 carbon atoms, after extremely toxic compounds which find utility in medicine as convulsants. The higher molecular weight compounds, particularly where each $R_f$ radical contains from 3 to 11 carbon atoms, are useful surfactants. These secondary fluoroalkylamines are also of value as intermediates to acrylamides from which useful polymers are obtained. (See U.S. Patents Nos. 2,795,615 and 2,701,814.)

It is known in the prior art (J. Org. Chem., 19, 391 (1954)) to prepare bis(trifluoroethylamine)

(i.e., $CF_3\text{—}CH_2\text{—}NH\text{—}CH_2\text{—}CF_3$)

by a lithium-aluminum hydride reduction of N-trifluoroethyl trifluoroacetamide $$(CF_3\text{—}CH_2\text{—}\overset{\overset{O}{\|}}{C}\text{—}NH\text{—}CH_2\text{—}CF_3)$$

which, in turn, is synthesized by reaction of trifluoroacetamide with trifluoroethylamine hydrochloride. An alternate prior art procedure for bis(1,1-dihydroperalkyl) amines, according to U.S. 2,795,615, involves lithium-aluminum hydride reduction of diperfluoroacylamides. Such lithium-aluminum hydride reductions are carried out in ether and present somewhat of an equipment problem when run in production quantities. Furthermore, lithium-aluminum hydride reductions are hazardous because of explosions which can occur when reducing fluorine-containing compounds (see Chemical & Engineering News, 33, 1368 (1955)).

It has now been found that fluoroalkylamines of the above structure may be safely and readily prepared by reacting a primary fluoroalkylamine of structure $$R_f\text{—}CH_2\text{—}NH_2$$

with a fluoroalkyl-p-toluenesulfonate of structure

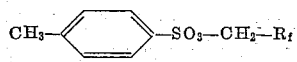

where $R_f$ represents a perfluoroalkyl radical, said reaction being carried out in the presence of a base.

In carrying out this novel process, the reactants are charged into a pressure vessel, agitated and heated under autogenous pressure. The reaction is initiated by heating and proceeds at a practical rate at temperatures of about 100° C. and higher. Temperatures up to about 300° C. may be used, but some decomposition of the reactants may occur at temperatures much above 300° C. and for that reason, higher temperatures are to be avoided. At the preferred temperature of 200° to 250° C., a period of time from about 1 to about 24 hours is required for completion; preferably, the reaction will be allowed to proceed for 5 to 10 hours. When the reaction process is completed, the pressure vessel is cooled to room temperature, opened, and the products recovered. This recovery is best made by steam distillation of the reaction mass to obtain the water-insoluble secondary fluoroalkyl amine in the distillate.

The primary fluoroalkylamine starting materials $$(R_f\text{—}CH_2\text{—}NH_2$$

i.e., 1,1-dihydroperfluoroalkylamines) are known compounds and are readily obtained. One technique for their preparation involves ammonolysis of the appropriate chloromethyl compound ($R_f$—$CH_2$—Cl). British Patents 689,425 and 717,232 disclose alternate methods for their preparation. The fluoroalkyl-p-toluenesulfonates are also well known compounds and are obtained by reacting a 1,1-dihydroperfluoroalkanol ($R_f$—$CH_2OH$) with p-toluene sulfonyl chloride (see U.S. Patent 2,894,991). The fluoroalkyl-p-toluenesulfonates are also known as tosyl esters or tosylates.

As indicated, the process of this invention is carried out in the presence of a base. The term "base" is meant to include all bases which are strong enough to form amide ions with a 1,1-dihydroperfluoroalkylamine. Well known examples of this class of bases are the alkali metal and alkaline earth metal salts of weak acids (i.e., those having a dissociation constant of about $10^{-4}$ or less) such as these metal hydroxides, acetates, formates, carbonates, bicarbonates, and cyanides (e.g., NaOH, $K_2CO_3$, $NaHCO_3$, $Ca(OH)_2$, $BaCO_3$, $Mg(OH)_2$, $LiCO_3$, KCN, $CH_3COOK$, HCOONa, etc.). The preferred bases are the alkali metal carbonates, particularly $Na_2CO_3$. In the absence of such bases the reaction does not proceed, nor are other techniques known by which the fluoroalkyl tosylate and amine can be made to react. It is preferred that anhydrous materials be used and that the reaction be carried out under anhydrous conditions.

The amounts of amine and tosylate reactants to be used are not critical since the reaction proceeds stoichiometrically. For this reason, at least equal molar amounts will normally be used and preferably an excess (about a 2 to 10-fold molar excess) of the primary amine will be employed. The amount of base taken will usually be from 1 to 2 moles per mole of tosylate used, and to avoid side reactions will preferably not be more than the molar equivalent of amine used.

The reaction is believed to proceed in two steps; viz.: (1) reaction of the base with the primary amine, which is somewhat acidic due to the electro-negative character of the fluorine atoms and (2) reaction of the salt thus formed with the tosyl ester to yield the secondary amine product. Thus:

$$R_f\text{—}CH_2\text{—}NH_2 + Na_2CO_3 \rightleftharpoons R_f\text{—}CH_2\text{—}NHNa + NaHCO_3$$

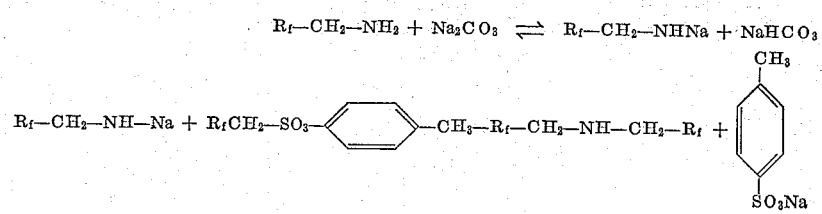

It will, of course, be understood that unsymmetrical secondary amine products are readily obtained by using reactants which have different $R_f$ groups. Thus:

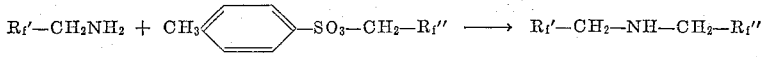

or more specifically

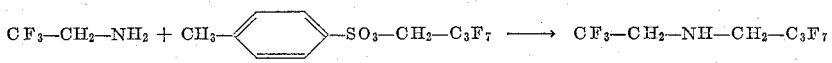

The following examples will further illustrate the process of this invention.

*Example I*

149 g. (1.5 M) of 1,1-dihydroperfluoroethylamine, 189 g. (0.75 M) of 1,1-dihydroperfluoroethyl-p-toluenesulfonate, and 159 g. (1.5 M) of anhydrous sodium carbonate are charged into a one-liter stainless steel autoclave, then heated with agitation for 21 hours at 230° C. The autogenous pressure remains steady at 490-500 p.s.i.g. The autoclave is then cooled to room temperature and, after opening, the reaction mixture is steam distilled. The heavy oil layer is separated, dried over anhydrous magnesium sulfate and fractionated to give 90 g. (0.5 M) of bis(2,2-trifluoroethyl)amine, B.P. 79° C.; $n_D^{25}$ 1.3010, yield 67%.

Infrared and nuclear magnetic resonance spectra confirmed the structure of the compound. Vapor liquid partition chromatography showed the product to be 99.5 mole % pure.

When the above example is repeated with calcium hydroxide as the base, essentially the same results are obtained.

*Example II*

Following the procedure of Example I, 1 mole of 1,1-dihydroperfluorohexyl-p-toluenesulfonate and 2 moles of 1,1-dihydroperfluorodecylamine are reacted in the presence of 2 moles of potassium hydroxide at 275° C. for 10 hours. After cooling, the reaction mixture is steam distilled and the 1,1-dihydroperfluorodecyl-1,1-dihydroperfluorohexylamine is separated from the distillate.

*Example III*

Following the procedure of Example 1, N,N-bis(1,1-dihydroperfluorobutyl)amine is obtained by reacting 1,1-dihydroperfluorobutyl-p-toluenesulfonate with 1,1-dihydroperfluorobutylamine in the presence of lithium carbonate.

It will be understood that in place of the specific fluoroamines in the above examples equivalent results may be obtained by use of any one of the following amines:

1,1-dihydroperfluoro-n-propylamine,
1-hydroperfluoroisopropylamine,
1,1-dihydroperfluorooctylamine,
1,1-dihydroperfluoroundecylamine,
1,1-dihydroperfluorooctadecylamine, and the like. In place of the fluoroalkyl-p-toluenesulfonates of the examples, tosylates may be used where the $R_f$ group is 1,1-dihydroperfluoro-n-propyl, 1,1-dihydroperfluorohexyl, and the like.

As many different embodiments of this invention will be apparent to those skilled in the art, this invention shall not be construed to be limited by the above description.

We claim:

1. A process for the preparation of fluoroalkylamines of structure $R_f$—$CH_2$—NH—$CH_2$—$R_f$ where $R_f$ is a perfluoroalkyl radical which consists of heating at a temperature between about 100° and 300° C. and at autogenous pressure a mixture of a primary 1,1-dihydroperfluoroalkylamine, a 1,1-dihydroperfluoroalkyl-p-toluenesulfonate, and a base selected from the group consisting of alkali metal and alkaline earth metal salts of weak acids having a dissociation constant below about $10^{-4}$, the amount of said base being between 1 and 2 moles per mole of said 1,1-dihydroperfluoroalkyl p-toluenesulfonate.

2. The process of claim 1 wherein the $R_f$ radicals are different perfluoroalkyl radicals.

3. A process for the preparation of fluoroalkylamines of structure $R_f$—$CH_2$—NH—$CH_2$—$R_f$ where $R_f$ is a perfluoroalkyl radical containing from one to eleven carbon atoms which consists of heating at a temperature between about 100° C. and 300° C. and under autogenous pressure, a mixture of a primary amine of structure $$R_f—CH_2—NH_2$$

a p-toluenesulfonate of structure.

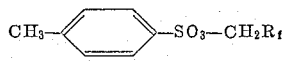

and from 1 to 2 moles per mole of said p-toluenesulfonate of a base selected from the group consisting of alkali metal and alkaline earth metal salts of weak acids having a dissociation constant below about $10^{-4}$.

4. The process of preparing bis(2,2-trifluoroethyl) amine by reacting 1,1-dihydroperfluoroethylamine and 1,1-dihydroperfluoroethyl-p-toluenesulfonate under autogenous pressure at a temperature between about 200° C. and 250° C. and in the presence of 1 to 2 moles per mole of said p-toluenesulfonate of a base selected from the group consisting of alkaline earth metal and alkali metal salts of weak acids having a dissociation constant below about $10^{-4}$.

5. The process of claim 4 wherein the base is an alkaline earth metal hydroxide.

6. The process of claim 4 wherein the base is an alkali metal carbonate.

7. The process of claim 4 wherein the base is sodium carbonate.

8. The process of preparing N,N-bis(1,1-dihydroperfluorobutyl)amine by reacting 1,1-dihydroperfluorobutyl-p-toluenesulfonate with 1,1-dihydroperfluorobutylamine at a temperature between about 200° C. and 250° C. under autogenous pressure and in the presence of 1 to 2 moles per mole of said p-toluenesulfonate of an alkali metal carbonate.

References Cited in the file of this patent

UNITED STATES PATENTS

| | | |
|---|---|---|
| 2,716,134 | Reynolds et al. | Aug. 23, 1955 |
| 2,837,518 | Jacob et al. | June 3, 1958 |

FOREIGN PATENTS

| | | |
|---|---|---|
| 813,868 | Great Britain | May 27, 1959 |

UNITED STATES PATENT OFFICE
CERTIFICATE OF CORRECTION

Patent No. 3,134,816

May 26, 1964

Francis L. Scott et al.

It is hereby certified that error appears in the above numbered patent requiring correction and that the said Letters Patent should read as corrected below.

Column 1, line 19, for "after" read -- are --; column 2, the lower formula should appear as shown below instead of as in the patent:

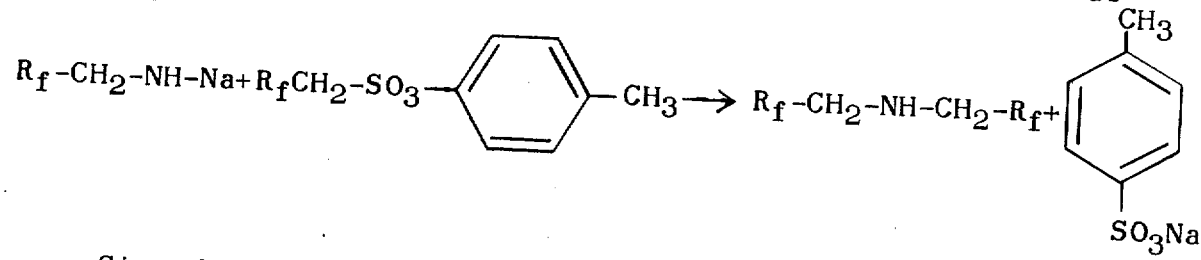

Signed and sealed this 20th day of October 1964.

(SEAL)
Attest:

ERNEST W. SWIDER
Attesting Officer

EDWARD J. BRENNER
Commissioner of Patents